(12) United States Patent
Lee et al.

(10) Patent No.: US 10,395,026 B2
(45) Date of Patent: Aug. 27, 2019

(54) METHOD FOR PERFORMING SECURITY FUNCTION AND ELECTRONIC DEVICE FOR SUPPORTING THE SAME

(71) Applicant: Samsung Electronics Co., Ltd, Gyeonggi-do (KR)

(72) Inventors: Tae Soo Lee, Seoul (KR); Young Su Seo, Gyeonggi-do (KR); Hye Min Song, Gyeonggi-do (KR); Dae Kyu Shin, Gyeonggi-do (KR); Jun Tae Lee, Gyeonggi-do (KR); Hee Kuk Lee, Gyeonggi-do (KR); Bum Taek Lim, Gyeonggi-do (KR); Yu Jin Jung, Gyeonggi-do (KR); Dong Jin Choi, Gyeonggi-do (KR); Tushar Balasaheb Sandhan, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 15/273,586

(22) Filed: Sep. 22, 2016

(65) Prior Publication Data

US 2017/0083700 A1 Mar. 23, 2017

(30) Foreign Application Priority Data

Sep. 22, 2015 (KR) ........................ 10-2015-0133745

(51) Int. Cl.
 *G06F 7/04* (2006.01)
 *G06F 21/51* (2013.01)
 *H04L 29/06* (2006.01)
(52) U.S. Cl.
 CPC ........ *G06F 21/51* (2013.01); *G06F 2221/034* (2013.01); *H04L 63/08* (2013.01)

(58) Field of Classification Search
 CPC ............ G06F 21/44; G06F 21/50; G06F 21/51
 USPC ............................................................ 726/7
 See application file for complete search history.

(56) References Cited

U.S. PATENT DOCUMENTS

| | | | |
|---|---|---|---|
| 8,336,086 B2 | 2/2012 | Seo | |
| 8,347,386 B2 | 1/2013 | Mahaffey et al. | |
| 8,656,160 B2 | 2/2014 | Scipioni et al. | |
| 9,043,919 B2 | 5/2015 | Wyatt et al. | |
| 9,081,954 B2 | 7/2015 | Forristal | |
| 9,104,840 B1 * | 8/2015 | Paczkowski | G06F 21/00 |

(Continued)

FOREIGN PATENT DOCUMENTS

WO 2014-039265 A1 3/2014

OTHER PUBLICATIONS

Schmeelk et al, Image Authenticity Implementing Principal Component Analysis (PCA), IEEE, Oct. 2013, pp. 1-3.*

(Continued)

*Primary Examiner* — Luu T Pham
*Assistant Examiner* — Jenise E Jackson

(57) ABSTRACT

An electronic device includes a memory configured to store an application, a communication interface, and a processor. The processor is configured to receive a request to install or execute the application, verify whether the application is authenticated compare at least part of an icon for executing the application with a security indication associated with security of the application. The electronic device provides a result of comparing the at least part of the icon with the security indication based on whether the application is authenticated.

16 Claims, 11 Drawing Sheets

(56) References Cited

U.S. PATENT DOCUMENTS

| | | | |
|---|---|---|---|
| 9,197,663 B1* | 11/2015 | Gilbert | G06F 3/04817 |
| 9,294,500 B2 | 3/2016 | Mahaffey | |
| 2004/0153649 A1* | 8/2004 | Rhoads | G06F 17/241 |
| | | | 713/176 |
| 2007/0300292 A1 | 12/2007 | Scipioni et al. | |
| 2008/0046738 A1* | 2/2008 | Galloway | H04L 63/1416 |
| | | | 713/176 |
| 2008/0144459 A1* | 6/2008 | Selinfreund | G11B 7/2472 |
| | | | 369/53.2 |
| 2010/0011419 A1 | 1/2010 | Seo | |
| 2010/0031022 A1* | 2/2010 | Kramer | G06F 21/6218 |
| | | | 713/155 |
| 2011/0047620 A1 | 2/2011 | Mahaffey et al. | |
| 2012/0110333 A1* | 5/2012 | Lukkarila | H04L 9/14 |
| | | | 713/176 |
| 2012/0240236 A1 | 9/2012 | Wyatt et al. | |
| 2012/0246079 A1* | 9/2012 | Wilson | H04L 63/0807 |
| | | | 705/67 |
| 2012/0266259 A1* | 10/2012 | Lewis | G06F 21/51 |
| | | | 726/30 |
| 2012/0292388 A1* | 11/2012 | Hernandez | G06Q 20/108 |
| | | | 235/379 |
| 2013/0078948 A1* | 3/2013 | Pecen | H04L 63/0823 |
| | | | 455/411 |
| 2013/0078949 A1* | 3/2013 | Pecen | H04L 63/101 |
| | | | 455/411 |
| 2013/0263262 A1 | 10/2013 | Forristal | |
| 2013/0276105 A1* | 10/2013 | Hinchliffe | G06F 21/50 |
| | | | 726/22 |
| 2014/0165174 A1 | 6/2014 | Scipioni et al. | |
| 2014/0201834 A1 | 7/2014 | Conforti | |
| 2014/0310770 A1 | 10/2014 | Mahaffey | |
| 2014/0317400 A1* | 10/2014 | Slodki | G06F 21/121 |
| | | | 713/155 |
| 2015/0089641 A1 | 3/2015 | Hwang et al. | |
| 2015/0113652 A1* | 4/2015 | Ben-Itzhak | G06F 21/52 |
| | | | 726/24 |
| 2015/0242455 A1 | 8/2015 | Ananthakrishnan et al. | |
| 2015/0302182 A1 | 10/2015 | Wyatt et al. | |
| 2015/0302249 A1* | 10/2015 | Hinchliffe | G06F 21/50 |
| | | | 382/181 |
| 2015/0302421 A1* | 10/2015 | Caton | G06Q 30/018 |
| | | | 705/17 |

OTHER PUBLICATIONS

Swaminathan et al, Image Tampering Identification Using Blind Deconvolution, IEEE, Oct. 11, 2006, pp. 2309-2312.*

Ginesu et al, Efficient Scrambling of Wavelet based Compressed Images, ACM, Sep. 18, 2006, pp. 1-5.*

The International Searchlng Authority, "Notification of Transmittal of the International Search Report and the Written Opinion of The International Searching Authority, or the Declaration," International Application No. PCT/KR2016/009815, dated Dec. 7, 2016, 13 pages, publisher The ISA/KR, International Application Division, Korean Intellectual Property Office. Daejeon, Republic of Korea.

* cited by examiner

ND ELECTRONIC DEVICE
METHOD FOR PERFORMING SECURITY FUNCTION AND ELECTRONIC DEVICE FOR SUPPORTING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Sep. 22, 2015 in the Korean Intellectual Property Office and assigned Serial number 10-2015-0133745, the entire disclosure of which is hereby incorporated by reference.

TECHNICAL FIELD

The present disclosure relates to methods for performing security functions and electronic devices for supporting the same.

BACKGROUND

With the development of computing systems, a number of application programs (or applications) which operate in electronic devices such as smartphones have been developed. Each of these applications may be written, packaged, and distributed to perform a specified function. The packaged application may include an execution icon. A user may expect to execute the corresponding application and to perform a specified function by selecting the execution icon.

Malicious applications which takes personal information or causes an error operation of an electronic device may be included in the above-mentioned applications. Particularly, recently, a malicious application having the same or similar execution icon to an application which requires a high level of security such as bank/financial transaction is distributed. This malicious application has concern that the user mistakes an unauthenticated application for an authenticated application due to the same or similar execution icon.

A specified security indication (e.g., an image pattern, a badge image, or text, and the like) may be added to an execution icon of the authenticated application. Therefore, the user may verify the specified security indication included in the execution icon to determine whether an application to be installed or executed is an authenticated application. However, if an execution icon of the unauthenticated application includes the specified security indication, for example, if a copied image pattern is included in the execution icon, there is concern that the user mistakes the unauthenticated application for the authenticated application.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method for performing a security function to control an operation associated with installing or executing an application if a specified security indication added to an execution icon of an authenticated application is included in an execution icon of an unauthenticated application and an electronic device for supporting the same.

In accordance with an aspect of the present disclosure, an electronic device includes a memory configured to store an application, a communication interface, and a processor, wherein the processor is configured to receive a request to install or execute the application, verify whether the application is authenticated, compare at least part of an icon for executing the application with a security indication associated with security of the application, and provide a result of comparing the at least part of the icon with the security indication based on whether the application is authenticated.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
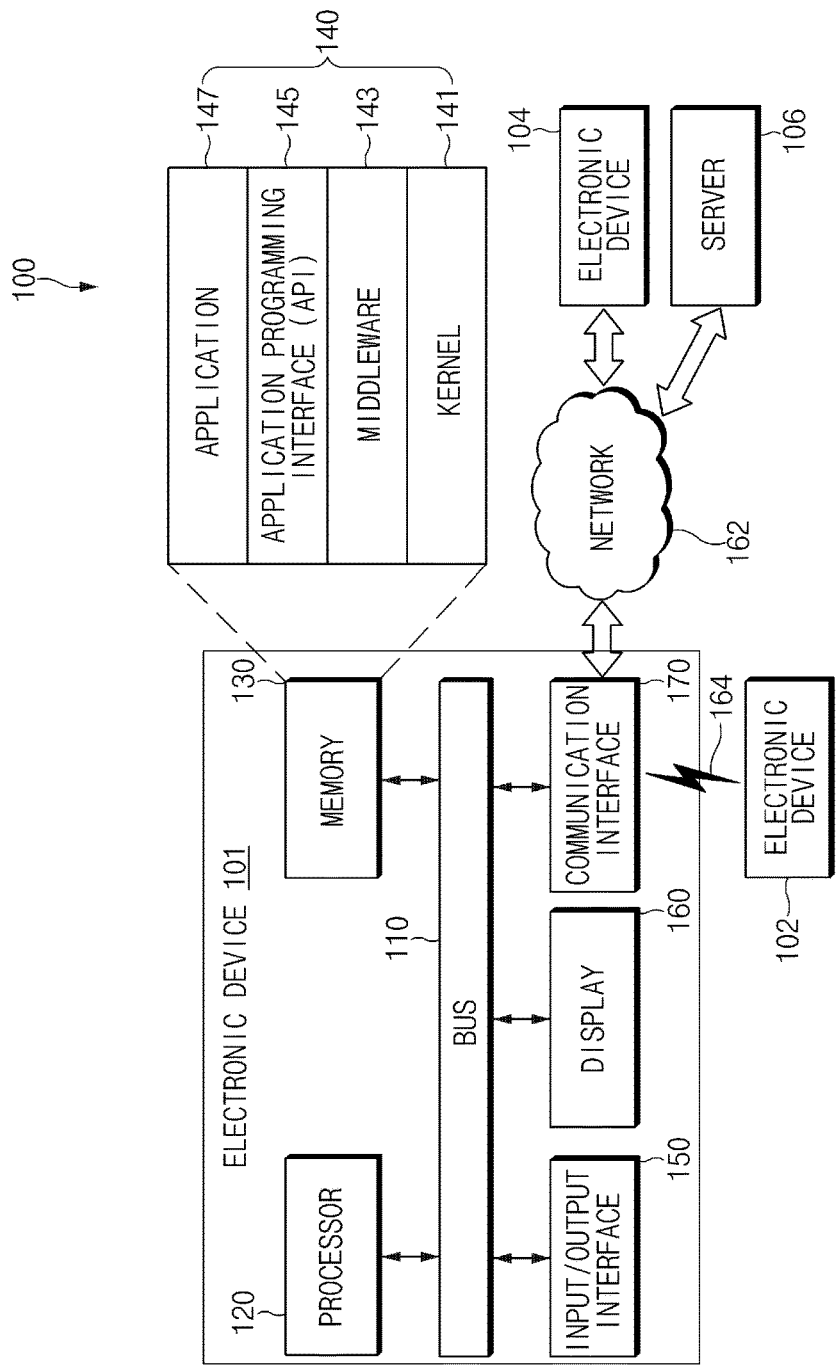
FIG. 1 illustrates a block diagram of an electronic device in a network environment according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HVID)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., SAMSUNG HOMESYNC™, APPLE TV®, or GOOGLE TV®), a game console (e.g., XBOX® or PLAYSTATION®), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MM), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates a block diagram of an electronic device 101 in a network environment 100 according to an embodiment. The electronic device 101 may control to install or execute an unauthenticated application. For example, if the unauthenticated application uses a specified security indication (e.g., an image pattern, a badge image, or text, and the like) added to an execution icon of an authenticated application, the electronic device 101 may perform a security function of controlling an operation associated with installing or executing the unauthenticated application.

An electronic device 101 in a network environment 100 according to various embodiments of the present disclosure will be described with reference to FIG. 1. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation related to communication and/or control of at least one of the other elements of the electronic device 101.

According to various embodiments, the processor 120 may control related components to verify whether the application 147 is authenticated. According to an embodiment, the processor 120 may analyze meta information of the application 147. For example, the processor 120 may verify whether security information indicating whether the application 147 is authenticated is included in the meta information. In this case, the processor 120 may control performing a function of a package manager which manages to install or execute a packaged application and may analyze meta information of an application to be analyzed, extracted by the package manager.

According to an embodiment, the processor 120 may send at least one of identification information and authentication information of the application 147 to an authentication server (e.g., a server 106) connected over wired/wireless communication based on a communication interface 170. The identification information of the application 147 may include, for example, a package name of the application 147. The authentication information of the application 147 may include, for example, data (e.g., an authenticated key value) associated with a signature of the application 147. Also, the processor 120 may verify whether the application 147 is authenticated, based on information (e.g., authentication result information) associated with a result of determining whether the application 147 is authenticated, received from the authentication server.

According to various embodiments, the processor 120 may analyze an execution icon of the application 147. According to an embodiment, the processor 120 may analyze whether a specified security indication is present in the execution icon of the application 147. The security indication may include, for example, an image pattern, a badge image, or text, and the like. For example, the processor 120 may analyze whether a badge image added to an authenticated application is included in the execution icon of the application 147. According to various embodiments, the processor 120 may measure a matching rate (or similarity) between the execution icon of the application 147 and the specified security indication. If the matching rate is greater than or equal to a specified level, the processor 120 may determine that the specified security indication is included in the execution icon of the application 147.

According to various embodiments, the processor 120 may perform a security function of controlling (or limiting) an operation associated with installing or executing an unauthenticated application. According to an embodiment, the processor 120 may control a memory 130 to delete an unauthenticated application among the application 147. For example, if a matching rate between an execution icon of the unauthenticated application and the specified security indication is a specified level or more (e.g., 80% or more of the entire icon size), the processor 120 may control the memory 130 to delete the unauthenticated application. According to another embodiment, the processor 120 may control a display 160 or an input/output (I/O) interface 150 to output a security warning notification object, when installing or executing the unauthenticated application. For example, if the matching rate between the execution icon of the unauthenticated application and the specified security indication is greater than or equal to the specified level, the processor 120 may control the display 160 or the I/O interface 150 to output a security warning notification object for guiding a user of the electronic device 101 to select the unauthenticated application to be installed or executed.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The application 147 may be a program written to perform a specified function and may be packaged and distributed. The application 147 may be installed in the electronic device 101 through various paths. For example, the application 147 may include a preloaded application or a third party application downloadable from an external electronic device (e.g., a first external electronic device 102, a second external electronic device 104, or the server 106).

The application 147 may include meta information indicating structured information of the application 147 in connection with installing or executing the application 147. According to an embodiment, if the application 147 is an authenticated application, it may include specified security information (e.g., tag information) in the meta information. Also, the application 147 may include an execution icon. The execution icon may perform a function of connecting to an execution file of the application 147. For example, if the user selects the execution icon of the application 147, the application 147 may be executed. According to an embodiment, if the application 147 is an authenticated application, it may include a specified security indication (e.g., an image pattern, a badge image, or text, and the like) in the execution icon.

According to various embodiments, the security information (e.g., tag information) included in the meta information may be data provided to only an authenticated application, when the application is generated. For example, the authentication server may provide the data to a maker (e.g., a programmer) who generates the authenticated application. The maker may include the data in the application 147 to generate the authenticated application.

According to various embodiments, when an application is installed, the specified security indication may be provided to only the authenticated application. For example, the electronic device 101 may include the specified security indication in an execution icon of the authenticated application at a time when the authenticated application is installed. In this regard, the specified security indication may be data which is collected from the authentication server or is previously stored in the memory 130, at a time when the authenticated application is installed.

According to various embodiments, the memory 130 may store at least one of an information (e.g., authentication result information) associated with a result of determining whether the application 147 is authenticated and an information associated with a result of analyzing the execution icon of the application 147. For example, the memory 130 may store information associated with a result of determining whether the application 147 is authenticated, received from the authentication server. In this case, when executing the application 147 later, the processor 120 may omit to send data to the authentication server and may determine whether the application 147 is authenticated, based on the information associated with the result of determining whether the application 147 is authenticated, stored in the memory 130. Also, the memory 130 may store information associated with a result of analyzing the execution icon of the application 147, analyzed by the processor 120. In this case, when executing the application 147 later, the processor 120 may omit to analyze the execution icon and may determine whether to perform the security function, based on the information associated with the result of analyzing the execution icon, stored in the memory 130.

According to various embodiments, the memory 130 may store a specified security indication to be applied to an execution icon of an authenticated icon. According to an embodiment, the electronic device 101 may collect the specified security indication from the authentication server and may store the collected security indication in the memory 130.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

According to various embodiments, the I/O interface 150 may output a voice object, including information indicating that the application 147 is an unauthenticated application, among security warning notification objects through an output means, for example, an audio device, such as a speaker or an earphone, which processes an audio signal.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

According to various embodiments, the display 160 may output a display object, including information indicating that the application 147 is an unauthenticated application, among the security warning notification objects. According to an embodiment, the display 160 may output the display object on a pop-up window, may output the display object on a menu screen, or may output the display object on a new screen in a screen shift scheme. In this regard, the display object may guide the user to select whether to install or execute the application 147. For example, the display object may include an object such as a button configured to perform a function of installing, executing, or deleting the application 147.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 164. The short-range communications may include at least one of WI-FI®, BLUETOOTH®, near field communication (NFC), magnetic stripe transmission (MST), or GNSS.

The MST may generate pulses according to transmission data and the pulses may generate electromagnetic signals. The electronic device 101 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from another device (e.g., the first electronic device 102, the second external electronic device 104, or the server 106) instead of or in addition to performing the function or service for itself. The other electronic device (e.g., the first electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
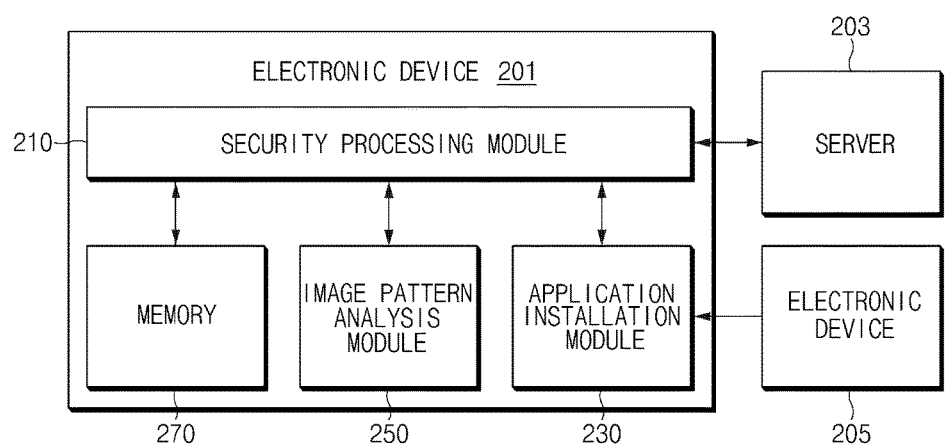
FIG. 2 illustrates a block diagram of an electronic device associated with performing a security function when an application is installed according to an embodiment of the present disclosure.

FIG. 2 illustrates a block diagram of an electronic device associated with performing a security function when an application is installed. An electronic device 201 may download and install an application from an external electronic device (e.g., an external electronic device 205 or a server 203). For example, the electronic device 201 may download and install an application from an application market server which provides applications with or without charge. Alternatively, the electronic device 201 may receive an application in the form of an attached file of an electronic mail (email) from an email server and install the received application. In various embodiments, the electronic device 201 may receive uniform resource locator (URL) information in the form of a message, and may download and install an application from an email server, a short message service/multimedia message service (SMS/MMS) server, a chat server, or a web server, and the like corresponding to a location of the application, indicated by the URL information.

Referring to FIG. 2, the electronic device 201 may include a security processing module 210, an application installation module 230, an image pattern analysis module 250, and a memory 270. According to various embodiments, at least some of the security processing module 210, the application installation module 230, or the image pattern analysis module 250 may perform the same or similar function to a processor 120 of FIG. 1. Also, the memory 270 may have the same or similar function to a memory 130 of FIG. 1. Also, the electronic device 201 may perform the same or similar function to an electronic device 101 of FIG. 1. The server 203 may perform the same or similar function to a server 106 of FIG. 1.

The security processing module 210 may verify whether an application is authenticated, when the application is installed. According to an embodiment, the security processing module 210 may identify whether specified security information (e.g., tag information or identifier, and the like) is present in meta information of the application. The security information may be, for example, information specified to indicate that the application is an authenticated application. The security information may be included in the application when the application is generated, for example, when a maker makes the application, the security information may be added. Alternatively, the security information may be included in the application when the application is provided, for example, the security information may be added when the application is downloaded from a service providing server.

If there is no specified security in the meta information, the security processing module 210 may determine the application as an unauthenticated application. If the specified security information is present in the meta information, the security processing module 210 may send at least one of identification information and authentication information of the application to an authentication server (e.g., the server 203). In various embodiments, if the specified security information is present in the meta information, the security processing module 210 may omit to send related information (e.g., the identification information or the authentication information) to the authentication server and may determine the application as an authenticated application. Alternatively, if there is no specified security information in the meta information, the security processing module 210 may send the related information to the authentication server, may receive information (e.g., authentication result information) associated with a result of determining whether the application is authenticated, and may determine whether the application is authenticated. According to various embodiments, the security processing module 210 may store the information associated with the result of determining whether the application is authenticated, received from the authentication server, in the memory 270.

According to various embodiments, if determining the application as the unauthenticated application, the security processing module 210 may send an execution icon of the application and a specified security indication (e.g., an image pattern, a badge image, or text, and the like) to the image pattern analysis module 250. According to various embodiments, the security processing module 210 may store information associated with a result of analyzing the execution icon, analyzed through the image pattern analysis module 250, in the memory 270.

According to various embodiments, the security processing module 210 may perform a security function of controlling (or limiting) an operation associated with installing the unauthenticated application. According to an embodiment, if the specified security indication is included at a specified rate or more in an execution icon of the unauthenticated application, the security processing module 210 may output a security warning notification object The application installation module 230 may install an application. The application installation module 230 may make an environment necessary for installing the application in the electronic device 201 and may update a list of installed applications such that a user of the electronic device 201 may execute the installed applications. According to an embodiment, the application installation module 230 may extract various resources (e.g., an execution icon or an image, and the like), authentication information, or an execution code, and the like from the application based on meta information of the application and may send the extracted data to a corresponding module. For example, the application installation module 230 may send the execution icon to a display (e.g., a display 160 of FIG. 1) to be output on a screen of the electronic device 201. Also, the application installation module 230 may send identification information and authentication information of the application to the security processing module 210.

According to various embodiments, the application installation module 230 may postpone installing the application until determining whether the application is installed. For example, the application installation module 230 may pause for the installation process at a time when the identification information and the authentication information of the application are sent to the security processing module 210 to determine whether the application is authenticated. According to various embodiments, if the application is determined as an authenticated application or if it is requested to install the application by the user, the application installation module 230 may proceed with the installation process which is paused for.

The image pattern analysis module 250 may analyze an execution icon of the application. According to an embodiment, the image pattern analysis module 250 may receive the execution icon and the specified security indication from the security processing module 210 and may analyze a matching rate (or similarity) between the execution icon and the specified security indication. For example, the image pattern analysis module 250 may analyze how many the specified security indication is matched to the execution icon. According to various embodiments, the image pattern analysis module 250 may send information (e.g., a matching rate) associated with the result of analyzing the execution icon to the security processing module 210.

The memory 270 may store the application and installation information of the application. For example, the memory 270 may store an application downloaded from the external electronic device and may store installation information of the application when the application is installed. The installation information of the application may include various resources, authentication information, or an execution code, and the like included in the application and may include storage location information of data (e.g., various resources, authentication information, or an execution code, and the like). Also, the memory 270 may store a list of applications installed in the electronic device 201. According to various embodiments, the memory 270 may store at least one of information associated with a result of determining whether the application is authenticated, received from the authentication server and information associated with a result of analyzing the execution icon analyzed based on the image pattern analysis module 250.

According to various embodiments, the security processing module 210 may collect a list of applications authenticated from the authentication server, at intervals of a specified time. The list of the authenticated applications may include identification information and authentication information of the authenticated application, and the like. In this case, the security processing module 210 may store the list of the authenticated applications in the memory 270.

Figure 3:
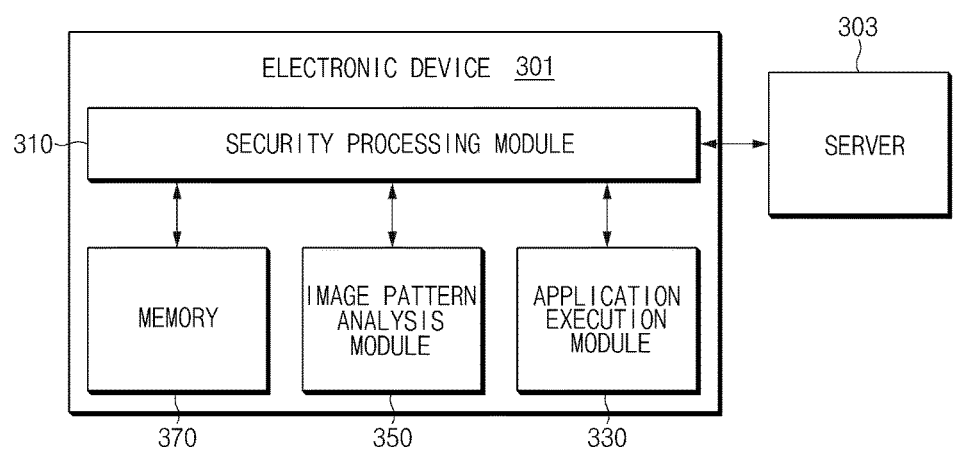
FIG. 3 illustrates a block diagram of an electronic device associated with performing a security function when an application is executed according to an embodiment of the present disclosure.

FIG. 3 illustrates a block diagram of an electronic device associated with performing a security function when an application is executed. According to various embodiments, an electronic device 301 may control to perform a security function when executing the application to be same or similar to a security function performed when installing the application. When executing the application, the electronic device 301 may verify whether the application is authenticated. If a matching rate (or similarity) between an execution icon of an unauthenticated application and a specified security indication is a specified level or more (e.g., 80% or more of the entire icon size), the electronic device 301 may perform the security function.

Referring to FIG. 3, the electronic device 301 may include a security processing module 310, an application execution module 330, an image pattern analysis module 350, and a memory 370. According to various embodiments, the security processing module 310 may have the same or similar configuration to a security processing module 210 of FIG. 2.

Also, the image pattern analysis module 350 and the memory 370 may have the same or similar configuration to an image pattern analysis module 250 and a memory 270 of FIG. 2, respectively. Also, the electronic device 301 may perform the same or similar function to an electronic device 101 of FIG. 1 or an electronic device 201 of FIG. 2. A description below will be omitted for the same or similar contents to the above-mentioned contents or contents corresponding to the above-mentioned contents.

The security processing module 310 may verify whether the application is authenticated when the application is executed. The method of verifying whether the application is authenticated may be the same or similar to a method of verifying whether an application is performed, described with reference to FIG. 2. Herein, the security processing module 310 may omit to send data to an authentication server (e.g., a server 303) when the application is executed and may determine whether the application is authenticated, based a list of authenticated applications stored in the memory 370. In various embodiments, the security processing module 310 may determine whether the application is authenticated, based on information (e.g., authentication result information) associated with a result of determining whether the application is authenticated, previously stored in the memory 370, when the application is installed.

According to various embodiments, the security processing module 310 may perform a security function of controlling (or limiting) an operation associated with executing an unauthenticated application. According to an embodiment, if a specified security indication is included at a specified rate or more in an execution icon of the unauthenticated application, the security processing module 310 may control the memory 370 to delete the application or may output a security warning notification object. According to various embodiments, the security processing module 310 may determine whether to perform the security function, based on information associated with a result of analyzing an execution icon of the application, previously stored in the memory 370, when the application is installed.

The application execution module 330 may execute the application. If a request to execute a specific application included in a list of applications installed in the electronic device 301 is received, the application execution module 330 may verify an environment for executing the application, for example, a spare area of the memory 370, may verify installation information of the application, and may load (or assign) an execution code and the like of the application into the memory 370. Also, the application execution module 330 may call and operate the execution code and the like loaded (or assigned) into the memory 370 based on a program routine.

According to various embodiments, the application execution module 330 may postpone executing the application until it is determined whether to execute the application. According to an embodiment, the application execution module 330 may send identification information and authentication information of the application to the security processing module 310 to determine whether the application is authenticated. In this case, the application execution module 330 may pause for the execution process at a time when transmitting the information. According to various embodiments, the application execution module 330 may determine the application as an authenticated application. Alternatively, if receiving a request to execute the application from a user of the electronic device 301, the application execution module 330 may continue proceeding with the execution process which is paused for.

The image pattern analysis module 350 may perform the same or similar to an image pattern analysis module 250 of FIG. 2. For example, the image pattern analysis module 350 may analyze an execution icon of the application. The image pattern analysis module 350 may analyze a matching rate between the execution icon and a specified security indication.

The memory 370 may perform the same or similar function to a memory 270 of FIG. 2. For example, the memory 370 may store the application or installation information of the application. According to an embodiment, the memory 370 may store execution information of the application. For example, the memory 370 may store information about a currently executing execution code of the application.

According to an embodiment, in FIG. 3, an embodiment of the present disclosure is exemplified as all the components of the electronic device 301 are included in the electronic device 301. Various embodiments of the present disclosure are not limited thereto. For example, at least some of the components of the electronic device 301 may be implemented to be included in an external electronic device (e.g., a first external electronic device 102, a second external electronic device 104, or a server 106 of FIG. 1).

According to various embodiments, at least some of each of the security processing modules 210 and 310, the application installation module 230, each of the image pattern analysis module 250 and 350, or the application execution module 330 may be implemented with software, firmware, hardware, or at least two or more combinations thereof. The at least some of each of the security processing modules 210 and 310, the application installation module 230, each of the image pattern analysis module 250 and 350, or the application execution module 330 may be implemented (e.g., executed) by, for example, a processor (e.g., a processor 120 of FIG. 1). The at least some of each of the security processing modules 210 and 310, the application installation module 230, each of the image pattern analysis module 250 and 350, or the application execution module 330 may include, for example, a module, a program, a routine, sets of instructions, or a process, and the like for performing one or more functions.

As described above, according to various embodiments, an electronic device may include a memory configured to store an application, a communication interface, and a processor. The processor may be configured to receive a request to install or execute the application, verify whether the application is authenticated, and provide a result of comparing at least part of an icon for executing the application with a security indication associated with security of the application, based on whether the application is authenticated.

According to various embodiments, the processor may be configured to send a request to authenticate the application to an external electronic device using the communication interface, and verify whether the application is authenticated, based on a response from the external electronic device.

According to various embodiments, the processor may be configured to receive the response corresponding to the request from the external electronic device, install or execute the application, if first authentication result information is included in the response, and provide the result of comparing the at least part of the icon with the security indication, if second authentication result information is included in the response.

According to various embodiments, the processor may be configured to identify whether there is a security information in the application in response to the request to install or execute the application, and determine whether the application is authenticated, based on whether there is the security information.

According to various embodiments, the security information may include a designated information to indicate that the application is an authenticated application.

According to various embodiments, the designated information may include a designated tag information included in meta information of the application.

According to various embodiments, the security indication may include at least one of an image pattern, a badge image, and text.

According to various embodiments, the processor may be configured to perform a security function of controlling an operation associated with installing or executing the application, based on the result of comparing the at least part of the icon with the security indication, if the application is an unauthenticated application.

According to various embodiments, the processor may be configured to perform at least one of cancelling installation of the application, cancelling execution of the application, deleting the application, and outputting a security warning notification object, if similarity between the at least part of the icon and the security indication is greater than or equal to a designated level.

According to various embodiments, the security warning notification object may include at least one of a first information about a result of authenticating the application and a second information about the result of comparing the at least part of the icon with the security indication.

According to various embodiments, the processor may be configured to display a notification, corresponding to the result of the at least part of the icon with the security indication, through a display operatively connected with the electronic device.

According to various embodiments, the processor may be configured to store at least one of a first information about a result of authenticating the application and a second information about the result of comparing the at least part of the icon with the security indication in the memory.

According to various embodiments, the processor may be configured to determine whether the application is authenticated, using the first information being stored in the memory when another request to install or execute the application is received, and provide the second information being stored in the memory.

As described above, according to various embodiments, an electronic device may include a memory configured to store at least one application and a processor configured to determine whether the application is authenticated, to analyze an execution icon of the application if the application is an unauthenticated application, and to perform a security function of limiting an operation associated with installing or executing the application if at least part of a specified image pattern is included in the execution icon.

According to various embodiments, if there is no specified information in meta information of the application, the processor may determine the application as an unauthenticated application.

According to various embodiments, the processor may send at least one of identification information and authentication information of the application to an authentication server and may verify whether the application is authenticated.

According to various embodiments, the processor may perform at least one of cancelling installation of the application, cancelling execution of the application, deleting the application, and outputting a security warning notification object, as the security function.

According to various embodiments, the security warning notification object may include at least one of a display object, including at least one of an information indicating that the application is an unauthenticated application and an information indicating that an execution icon of the unauthenticated application includes the specified image pattern, and a voice object including the information.

According to various embodiments, the processor may cancel installation of the application, may cancel execution of the application, or may delete the application if a matching rate between an execution icon of the application and the image pattern is greater than or equal to a specified value. The processor may output the security warning notification object if the matching rate is less than the specified value.

According to various embodiments, the processor may store at least one of an information associated with a result of determining whether the application is authenticated and an information associated with a result of analyzing an execution icon of the application in the memory.

According to various embodiments, the processor may determine whether the application is authenticated, based on information associated with a result of determining whether the application is authenticated, stored in the memory and may determine whether to perform the security function, based on information associated with a result of analyzing the execution icon.

According to various embodiments, the processor may collect a list of authenticated applications at intervals of a specified time from an authentication server and may determine whether the application is authenticated, based on the collected list of the applications.

Figure 4A:
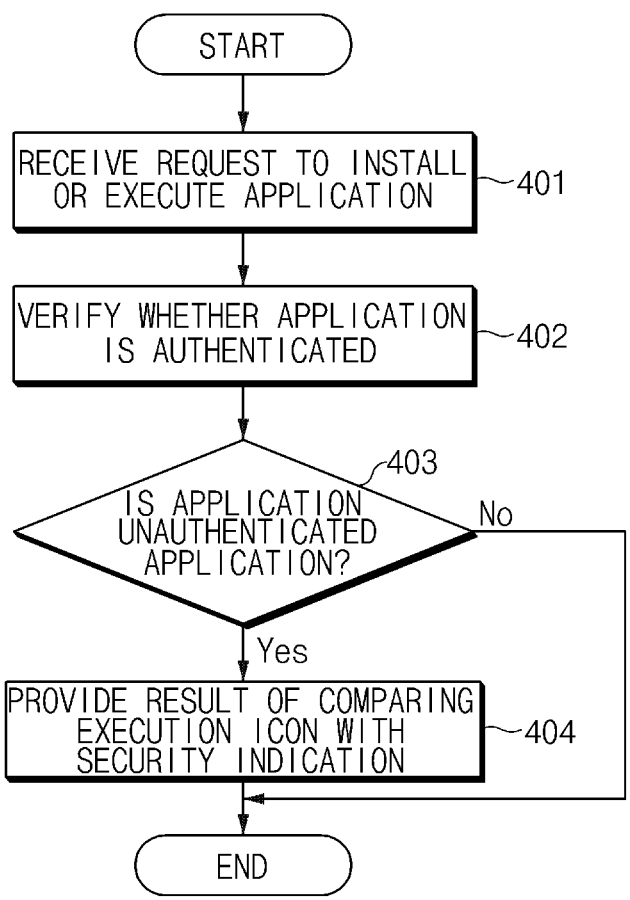
FIG. 4A illustrates a flowchart of an operation method of an electronic device associated with performing a security function according to an embodiment of the present disclosure.

FIG. 4A illustrates a flowchart of an operation method of an electronic device associated with performing a security function according to an embodiment.

Referring to FIG. 4A, in operation 401, an electronic device (e.g., a processor 120 of FIG. 1, an application installation module 230 of FIG. 2, an application execution module 330 of FIG. 3) may receive a request to install or execute an application. According to an embodiment, the electronic device may receive a request to install the corresponding application when downloading the application from an external electronic device (e.g., an electronic device 102 or 104 of FIG. 1, an electronic device 205 of FIG. 2, a server 106 of FIG. 1, a server 203 of FIG. 2, or a server 303 of FIG. 3). Also, when the user selects a specific application included in a list of applications installed in the electronic device, the electronic device may receive a request to execute the corresponding application.

In operation 402, the electronic device may verify whether the application is authenticated. According to an embodiment, the electronic device may send a request to authenticate the application to an authentication server (e.g., the server 106, 203, or 303) using a communication interface (e.g., a communication interface 170 of FIG. 1). According to various embodiments, when requesting the authentication server to authenticate the application, the electronic device may send at least one of identification information (e.g., a package name) of the application and authentication information (e.g., an authenticated key value) of the application to the authentication server. In this case, the authentication server may determine whether the application is authenticated, using at least one of the identification information and the authentication information of the application and may send authentication result information, about whether the application is authenticated, as a response corresponding to the request to the electronic device. Therefore, the electronic device may receive the response and may determine whether the application is authenticated, based on the authentication result information included in the response.

According to various embodiments, the electronic device may identify whether there is security information from the application and may determine whether the application is authenticated, based on whether there is the security information. The security information may be, for example, information specified indicating that the application is an authenticated application. The security information may include specified tag information or specified identifier, and the like included in meta information of the application.

In operation 403, the electronic device may determine whether the application is an unauthenticated application. According to an embodiment, if the authentication result information received from the authentication server includes information corresponding to an authentication success, the electronic device may determine the application as the authenticated application. Alternatively, if the authentication result information includes information corresponding to an authentication failure, the electronic device may determine the application as an unauthenticated application. According to various embodiments, if the application includes the security information, the electronic device may determine the application as an authenticated application. Alternatively, if the application does not include the security information, the electronic device may determine the application as an unauthenticated application.

According to various embodiments, if the application is the unauthenticated application, in operation 404, the electronic device may provide a result of comparing at least part of an icon (e.g., an execution icon) for executing the application with a security indication (e.g., an image pattern, a badge image, or text, and the like) associated with security of the application. According to an embodiment, the electronic device may display notification corresponding to the result of comparing the at least part of the icon with the security indication through a display (e.g., a display 160 of FIG. 1) operatively connected with the electronic device.

According to various embodiments, the electronic device may measure similarity between the at least part of the icon with the security indication. If the similarity is greater than or equal to a specified level, the electronic device may perform a security function of controlling an operation associated with installing or executing the application. According to an embodiment, if the similarity is greater than or equal to the specified level, the electronic device may cancel installation of the application, may cancel execution of the application, may delete the application, or may output a security warning notification object.

According to various embodiments, if the application is the authenticated application, the electronic device may install or execute the application.

Figure 4B:
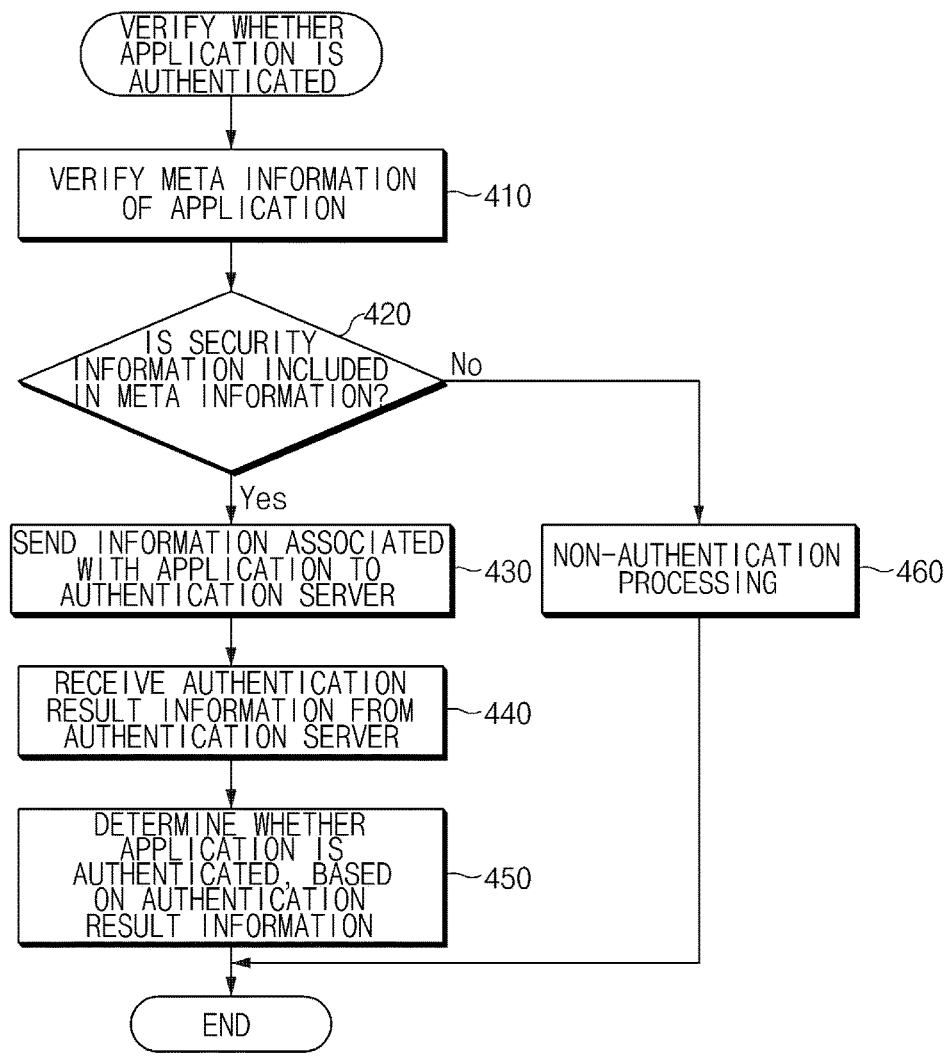
FIG. 4B illustrates a flowchart of an operation method of an electronic device associated with verifying whether an application is authenticated, according to an embodiment of the present disclosure.

FIG. 4B illustrates a flowchart of an operation method of an electronic device associated with verifying whether an application is authenticated, according to an embodiment.

Referring to FIG. 4B, if receiving a request to verify whether an application is authenticated, in operation 410, an electronic device (e.g., a processor 120 of FIG. 1 or a security processing module 210 of FIG. 2, or a security processing module of FIG. 3) may verify meta information of the application. According to various embodiments, the authenticated application may include specified security information, for example, specified tag information and the like in the meta information.

In operation 420, the electronic device (e.g., the processor 120 or the security processing module 210 or 310) may determine, for example, whether the specified security information is included in the meta information. According to various embodiments, if the specified security information is not included in the meta information, in operation 460, the electronic device may perform non-authentication processing. For example, the electronic device may determine the application as an unauthenticated application.

According to various embodiments, if the specified security information is included in the meta information, in operation 430, the electronic device (e.g., the processor 120 or the security processing module 210 or 310) may send information about the application to an authentication server. According to an embodiment, the electronic device may send at least one of identification information (e.g., a package name) of the application and authentication information (e.g., an authenticated key value) of the application to the authentication server. In this regard, the authentication server may have a list of previously authenticated applications, each of which includes identification information or authentication information, and the like of the application. In this case, the authentication server may compare the at least one of the identification information and the authentication information received from the electronic device with the list of the authenticated applications to determine whether the application is authenticated. Also, the authentication server may send information (e.g., authentication result information) about the result of determining whether the application is authenticated to the electronic device. Therefore, in operation 440, the electronic device (e.g., the processor 120 or the security processing module 210 or 310) may receive the information about the result of determining whether the application is authenticated from the authentication server.

In operation 450, the electronic device (e.g., the processor 120 or the security processing module 210 or 310) may determine whether the application is authenticated, based on the information about the result of determining whether the application is authenticated. For example, if the information about the result of determining whether the application is authenticated includes a response signal corresponding to an authentication success, the electronic device may determine the application as an authenticated application. Alternatively, if the information about the result of determining whether the application is authenticated includes a response signal corresponding to an authentication failure, the electronic device may determine the application as an unauthenticated application.

Figure 5:
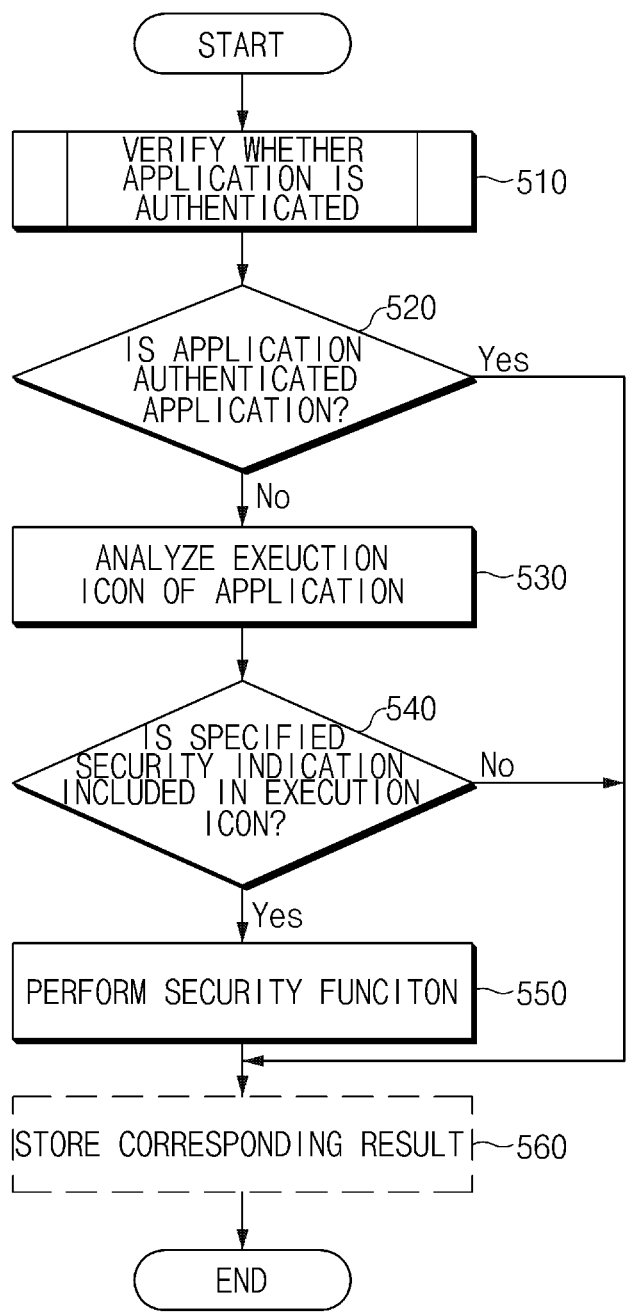
FIG. 5 illustrates a flowchart of an operation method of an electronic device associated with performing a security function when an application is installed, according to an embodiment of the present disclosure.

FIG. 5 illustrates a flowchart of an operation method of an electronic device associated with performing a security function when an application is installed, according to an embodiment.

Referring to FIG. 5, if receiving a request to install an application, in operation 510, an electronic device (e.g., a processor 120 of FIG. 1, a security processing module 210 of FIG. 2, or a security processing module 310 of FIG. 3) may verify whether the application is authenticated. The operation of verifying whether the application is authenticated is as described with reference to FIG. 4B. For example, the electronic device may verify meta information of the application. If specified security information is not included in the meta information, the electronic device may determine the application as an unauthenticated application. Alternatively, if the specified security information is included in the meta information, the electronic device may send information associated with the application to an authentication server, may receive information (e.g., authentication result information) about a result of determining whether the application is authenticated from the authentication server, and may determine whether the application is authenticated, based on the received information about the result.

In operation 520, the electronic device (e.g., the processor 120 or the security processing module 210 or 310) may verify whether the application is an authenticated application. According to various embodiments, if the application is the authenticated application, in operation 560, the electronic device (e.g., the processor 120 or the security processing module 210 or 310) may store the information about the result of determining whether the application is authenticated in a memory (e.g., a memory 130 of FIG. 1, a memory 270 of FIG. 2, or a memory 370 of FIG. 3). For example, the electronic device may store information, indicating that the application is authenticated, together with identification information of the application in the memory.

According to various embodiments, if the application is the unauthenticated application, in operation 530, the electronic device (e.g., the processor 120, an image pattern analysis module 250 of FIG. 2, or an image pattern analysis module 350 of FIG. 3) may analyze an execution icon of the application. According to various embodiments, the authenticated application may include a specified security application, for example, an image pattern, a badge image, or text, and the like in the execution icon. Therefore, if a matching rate (or similarity) between an execution icon of the unauthenticated application and the specified security indication is greater than or equal to a specified level, a user of the electronic device may misrecognize the application as the authenticated application.

In operation 540, the electronic device (e.g., the processor 120 or the security processing module 210 or 310) may determine that the execution icon includes the specified security indication. According to an embodiment, the electronic device may determine the matching rate between the execution icon and the specified security indication. According to various embodiments, if the execution icon does not include the specified security indication, in operation 560, the electronic device (e.g., the processor 120 or the security processing module 210 or 310) may store information about the result of analyzing the execution icon in the memory. For example, the electronic device may store information, indicating that the execution icon of the application does not include the specified security indication, together with the identification information of the application in the memory. In various embodiments, if the matching rate between the execution icon and the specified security indication is less than the specified value, the electronic device may perform operation 560. In this case, the electronic device (e.g., the processor 120 or the security processing module 210 or 310) may store the matching rate together with the identification information of the application in the memory.

According to various embodiments, if the execution icon includes the specified security indication, in operation 550, the electronic device (e.g., the processor 120 or the security processing module 210 or 310) may perform a security function. For example, the electronic device may cancel installation of the application or may output a security warning notification object. According to various embodiments, the electronic device may perform the security function in a different way based on the information about the result of analyzing the execution icon, for example, the matching rate. For example, if the matching rate is greater than or equal to the specified value, the electronic device may cancel installation of the application. For example, if the matching rate is less than the specified value, the electronic device may output the security warning notification object.

In this regard, the security warning notification object may include a display object corresponding to at least one of an information indicating that the application is an unauthenticated application and an information indicating that an execution icon of the unauthenticated application includes the specified security indication. Also, the security warning notification object may include a voice object corresponding to the information. According to various embodiments, the security warning notification object may guide the user to select whether to install the application. For example, the security warning notification object may include an object such as a button configured to perform a function of installing the application or cancelling installation of the application.

According to various embodiments, if the execution icon includes the specified security indication (or if the matching rate between the execution icon and the specified security indication is greater than or equal to the specified value), in operation 560, the electronic device (e.g., the processor 120 or the security processing module 210 or 310) may store the information about the result of analyzing the execution icon in the memory. In various embodiments, after performing operation 550, the electronic device may store the result of performing the security function in the memory. For example, the electronic device may store the result of installing the application or cancelling installation of the application in the memory.

According to various embodiments, in operation 560, the electronic device (e.g., the processor 120 or the security processing module 210 or 310) may install the application or may cancel installation of the application, based on the corresponding result concurrently with storing the corresponding result in the memory or at intervals of a specified time. According to various embodiments, if the application is the unauthenticated application and if the matching rate between the execution icon of the unauthenticated application and the specified security indication is less than the specified value, the electronic device may perform the security function.

Figure 6:
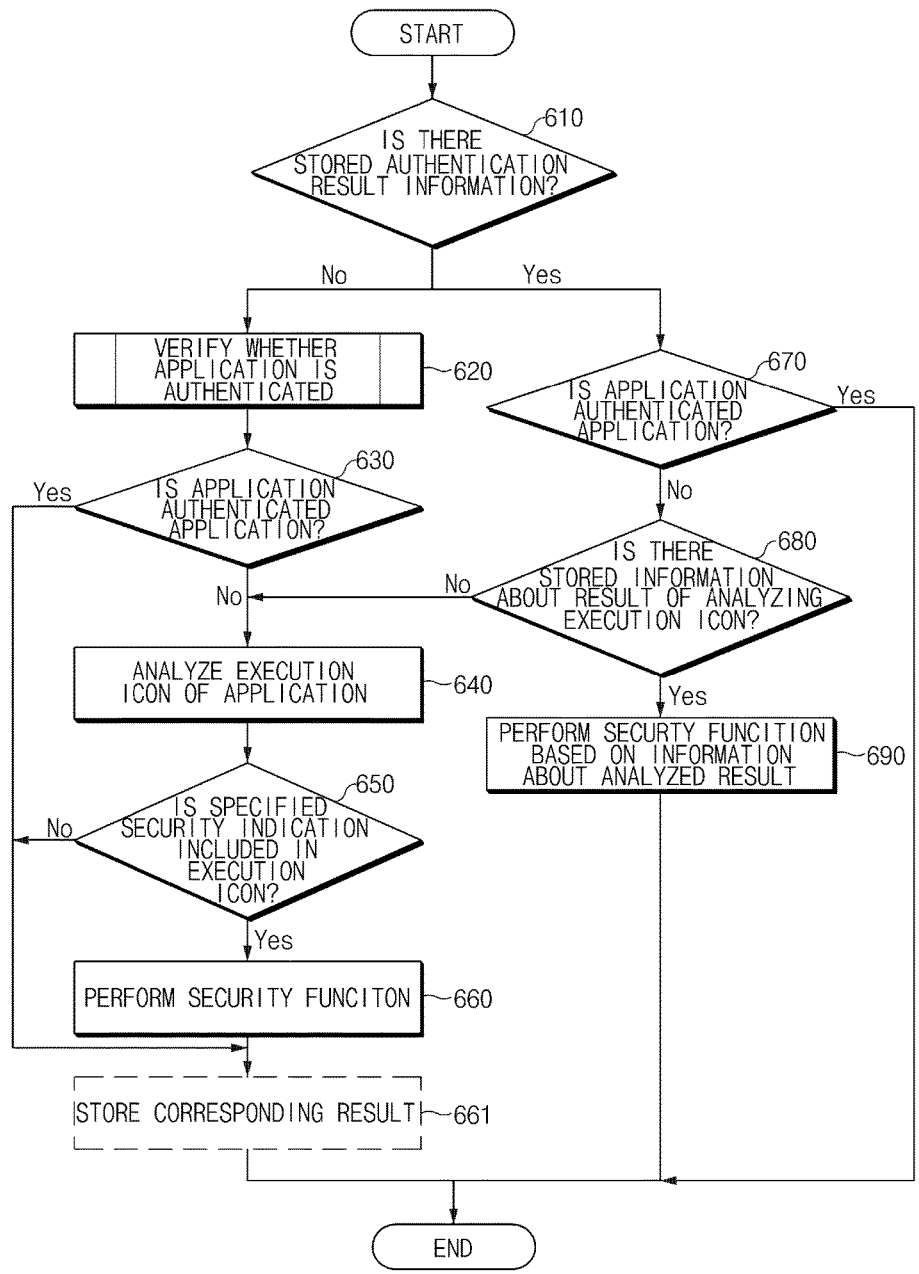
FIG. 6 illustrates a flowchart of an operation method of an electronic device associated with performing security function when an application is executed, according to an embodiment of the present disclosure.

FIG. 6 illustrates a flowchart of an operation method of an electronic device associated with performing security function when an application is executed, according to an embodiment.

Referring to FIG. 6, if receiving a request to execute an application, in operation 610, an electronic device (e.g., a processor 120 of FIG. 1, a security processing module 210 of FIG. 2, or a security processing module 310 of FIG. 3) may verify whether there is information (e.g., authentication result information) about a result of determining whether the application is authenticated, stored in a memory (e.g., a memory 130 of FIG. 1, a memory 270 of FIG. 2, or a memory 370 of FIG. 3). According to various embodiments, if there is no the information about the result of determining whether the application is authenticated, in operation 620, the electronic device (e.g., the processor 120 or the security processing module 210 or 310) may perform an operation of verifying whether the application is authenticated. The operation of verifying whether the application is authenticated is as described with reference to FIG. 4B.

In operation 630, the electronic device (e.g., the processor 120 or the security processing module 210 or 310) may verify whether the application is an authenticated application. According to various embodiments, if the application is the authenticated application, in operation 661, the electronic device may store the corresponding result in the memory. Also, the electronic device may execute the application.

According to various embodiments, if the application is an unauthenticated application, in operation 640, the electronic device (e.g., the processor 120, an image pattern analysis module 250 of FIG. 2, or an image pattern analysis module 350 of FIG. 3) may analyze an execution icon of the application. In operation 650, the electronic device (e.g., the processor 120 or the security processing module 210 or 310) may determine the execution icon includes a specified security indication. Alternatively, the electronic device may calculate a matching rate (or similarity) between the execution icon and the specified security indication.

According to various embodiments, if the execution icon does not include the specified security indication (or if the matching rate between the execution icon and the security indication is less than a specified level), in operation 661, the electronic device may store the corresponding result in the memory. According to various embodiments, if the execution icon does not include the specified security indication (or if the matching rate between the execution icon and the security indication is less than the specified level), in operation 660, the electronic device may perform a security function.

According to various embodiments, if the execution icon includes the specified security indication (or if the matching rate between the execution icon and the security indication is greater than or equal to the specified level), in operation 660, the electronic device (e.g., the processor 120 or the security processing module 210 or 310) may perform the security function. For example, the electronic device may delete the application or may output a security warning notification object. In this case, the security warning notification object may guide a user of the electronic device to select the application to be deleted, be executed, or cancel execution. For example, the security warning notification object may include an object such as a button configured to perform a function of deleting the application, executing the application, or cancelling installation of the application. Also, in operation 661, the electronic device (e.g., the processor 120 or the security processing module 210 or 310) may store the corresponding result in the memory, and may delete the application, may execute the application, or cancel installation of the application, based on the result of performing the security function.

According to various embodiments, if there is the information about the result of determining whether the application is authenticated, in operation 670, the electronic device (e.g., the processor 120 or the security processing module 210 or 310) may determine whether the application is an authenticated application, based on the information about the result of determining whether the application is authenticated. According to various embodiments, if the application is the authenticated application, the electronic device may execute the application.

According to various embodiments, if the application is an unauthenticated application, in operation 680, the electronic device (e.g., the processor 120 or the security processing module 210 or 310) may verify whether there is information about a result of analyzing an execution icon of the application, stored in the memory. If there is no information about the result of analyzing the execution icon, the electronic device may perform operation 640.

According to various embodiments, if there is the information about the result of analyzing the execution icon, in operation 690, the electronic device (e.g., the processor 120 or the security processing module 210 or 310) may perform the security function based on the information about the result of analyzing the execution icon. For example, the electronic device may delete the application or may output a security warning notification object.

According to various embodiments, the electronic device may perform the security function in a different way based on the information about the result of analyzing the execution icon. According to an embodiment, the electronic device may perform the security function in a different way based on the matching rate between the execution icon and the specified security application. For example, if the matching rate is greater than or equal to a specified level, the electronic device may delete the application. If the matching rate is less than the specified level, the electronic device may output the security warning notification object.

The operations (e.g., operations 401 to 404 of FIG. 4A, operations 410 to 460 of FIG. 4B, operations 510 to 560 of FIG. 5, or operations 610 to 690 of FIG. 6) described in the process or method shown in FIGS. 4A to 6 may be executed by a successive method, a parallel method, a repeated method, or a heuristic method. For example, some operations may be executed in a different order or may be omitted, and other operations may be added.

As described above, according to various embodiments, a method for performing a security function in an electronic device may include receiving a request to install or execute an application, verifying whether the application is authenticated, and providing a result of comparing at least part of an icon for executing the application with a security indication associated with security of the application, based on whether the application is authenticated.

According to various embodiments, the verifying of whether the application is authenticated may include sending a request to authenticate the application to an external electronic device using the communication interface included in the electronic device, receiving a response corresponding to the request from the external electronic device, and determining whether the application is authenticated, based on authentication result information included in the response.

According to various embodiments, the method further include installing or executing the application, if the authentication result information includes an information corresponding to an authentication success, and providing the result of comparing the at least part of the icon with the security indication, if the authentication result information includes an information corresponding to an authentication failure.

According to various embodiments, the verifying of whether the application is authenticated may include identifying whether there is a security information in the application, and determining whether the application is authenticated, based on whether there is the security information.

According to various embodiments, the method further include performing security function of controlling an operation associated with installing or executing the application, based on the result of comparing the at least part of the icon with the security indication, if the application is an unauthenticated application.

According to various embodiments, the performing of the security function may include at least one of cancelling installation of the application, cancelling execution of the application, deleting the application, and outputting a security warning notification object, if similarity between the at least part of the icon and the security indication is greater than or equal to a designated level.

As described above, according to various embodiments, a method for performing a security function in an electronic device may include determining whether an application is performed, analyzing an execution icon of the application if the application is an unauthenticated application, and performing a security function of limiting an operation associated with installing or executing the application if at least part of a specified image pattern is included in the execution icon.

According to various embodiments, the determining of whether the application is performed may include determining the application as an unauthenticated application if there is no specified information in meta information of the application.

According to various embodiments, the determining of whether the application is authenticated may include sending at least one of identification information of the application and authentication information of the application to an authentication server and verifying whether the application is authenticated.

According to various embodiments, the performing of the security function may include at least one of cancelling installation of the application, cancelling execution of the application, detecting the application, and outputting a security warning notification object.

According to various embodiments, the outputting of the notification warning notification object may include at least one of outputting a display object, including at least one of an information indicating that the application is an unauthenticated application and an information indicating that an execution icon of the unauthenticated application includes the specified image pattern, on a screen of the electronic device and outputting a voice object including the information through an audio output device of the electronic device.

According to various embodiments, the method may further include cancelling installation of the application, cancelling execution of the application, or deleting the application, if a matching rate between an execution icon of the application and the image pattern is greater than or equal to a specified value, and outputting the security warning notification object if the matching rate is less than the specified value.

According to various embodiments, the method may further include storing at least one of an information about the result of determining whether the application is authenticated and an information about the result of analyzing the execution icon of the application in the memory.

According to various embodiments, the method may further include at least one of determining whether the application is authenticated based on the information about the result of determining whether the application is performed among the result information stored in the memory and determining whether the security function is performed based on the information of analyzing the execution icon among the result information.

According to various embodiments, the method may further include collecting a list of authenticated applications from an authentication server at intervals of a specified time. The determining of whether the application is authenticated may include determining whether the application is authenticated, based on the collected list of the applications.

Figure 7:
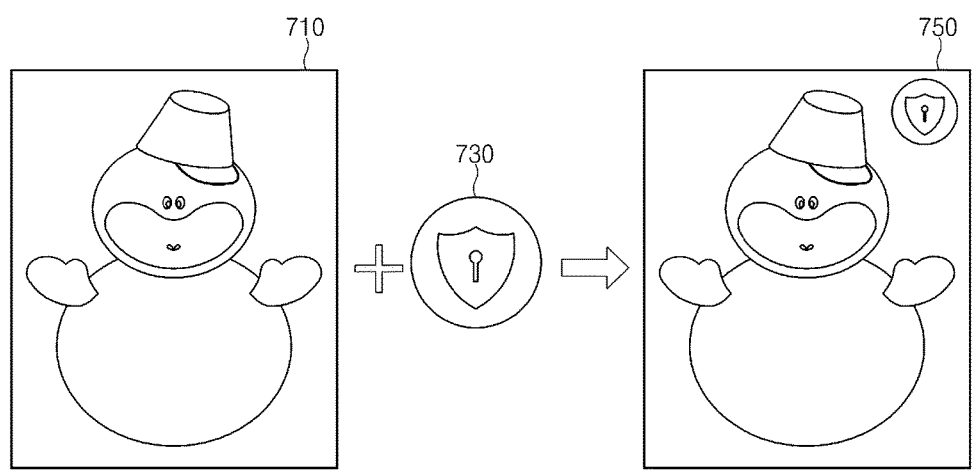
FIG. 7 illustrates an operation of adding a specified security indication to an execution icon, according to an embodiment of the present disclosure.

FIG. 7 illustrates an operation of adding a specified security indication to an execution icon, according to an embodiment.

Referring to FIG. 7, an authenticated application may include a specified security application 730 in its execution icon 710. According to an embodiment, the specified security indication 730 may include an image pattern, a badge image, or text, and the like. According to various embodiments, when making an application, a maker of the application may register the application in advance for an authentication server. For example, the maker may send at least one of identification information and authentication information of the application to the authentication server and may register the application for the authentication server. In this case, the authentication server may authenticate the application based on the identification information or the authentication information of the application. Also, the authentication server may provide the result of authenticating the application to the maker.

According to various embodiments, when installing the authenticated application, an electronic device may add the specified security indication 730 to an execution icon of the authenticated application. According to an embodiment, when installing the application, the electronic device may request the authentication server to verify whether the application is authenticated. If it is verified that the application is an authenticated application, the electronic device may add the specified security indication 730 to the execution icon 710 and may install the application. According to various embodiments, the specified security indication 730 may be data which is collected from the authentication server when the application is installed or is previously stored in a memory of the electronic device.

Therefore, if the user installs the authenticated application in the electronic device, an execution icon 750 including the specified security indication 730 may be output on a screen of the electronic device of the user.

According to various embodiments, the security application 730 may be included in at least part of the execution icon 710. For example, the security indication 730 may be displayed on part of a region where the execution icon 710 is displayed (e.g., a right upper end of the execution icon 710) or may be displayed to be overlapped with the execution icon 710. Also, the execution icon 750 including the security indication 730 may be displayed to be distinguished from the execution icon 710 which does not include the security indication 730. For example, at least part of a portion of the execution icon 750 including the security indication 730 may be displayed to be different in color, luminosity, transparency, or size, and the like from the execution icon 710 which does not include the security indication 730.

Figure 8:
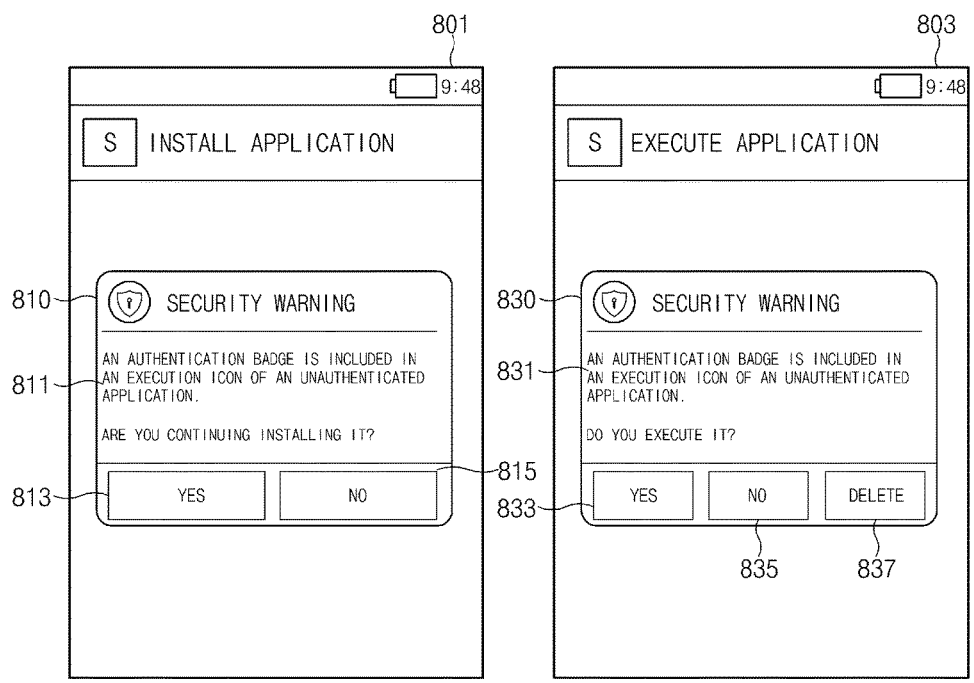
FIG. 8 illustrates a security warning notification object according to an embodiment of the present disclosure.

FIG. 8 illustrates a security warning notification object according to an embodiment.

Referring to FIG. 8, an electronic device (e.g., an electronic device 101 of FIG. 1) may output an application installation screen 801 on a display (e.g., a display 160 of FIG. 1) when installing an application. According to various embodiments, if the application is an authenticated application, the electronic device may output a display object (not shown) indicating an installation progress rate of the application on the application installation screen 801. According to various embodiments, if the application is an unauthenticated application and if an execution icon of the unauthenticated application includes a specified security indication, the electronic device may output an installation security warning notification object 810 on the application installation screen 801. In various embodiments, if the application is the unauthenticated application, the electronic device may output the installation security warning notification object 810 irrespective of whether the execution icon of the unauthenticated application includes the specified security indication.

The installation security warning notification object 810 may include text 811 corresponding to at least one of information indicating that an application to be installed is an unauthenticated application and information indicating that an execution icon of the unauthenticated application includes the specified security indication, an installation button 813 of the application, an installation cancellation button 815 of the application, and the like. According to various embodiments, the electronic device may output a voice object corresponding to the text 811 through its audio output device.

According to various embodiments, the electronic device may end the output of the installation security warning notification object 810 in response to the selection of the installation button 813 and may install the application. According to various embodiments, the electronic device may end the output of the installation security warning notification object 810 in response to the selection of the installation cancellation button 815 and may cancel installation of the application.

According to various embodiments, when executing the application, the electronic device may output an application execution screen 803 on the display. The application execution screen 803 may be a screen associated with performing a function of the application. Alternatively, the application execution screen 803 may be a notification display screen generated before a function of the application is performed. In various embodiments, the electronic device may output an execution security warning notification object 830 on a screen which displays an execution icon of the application, without separately configuring the application execution screen 803. According to various embodiments, if the application is the unauthenticated application and if the execution icon of the application includes the specified security indication, the electronic device may output the execution security warning notification object 830 on the application execution screen 803. In various embodiments, if the application is the unauthenticated application, the electronic device may output the execution security warning notification object 830 irrespective of whether the execution icon of the application includes the specified security indication.

The execution security warning notification object 830 may include text 831 corresponding to at least one of information indicating that an application to be executed is an unauthenticated application and information indicating that an execution icon of the unauthenticated application includes the specified security indication, an execution button 833 of the application, an execution cancellation button 835 of the application, a deletion button 837 of the application, and the like. According to various embodiments, the electronic device may output a voice object corresponding to the text 831 through the audio output device.

According to various embodiments, the electronic device may end the output of the execution security warning notification object 830 in response to the selection of the execution button 833 and may execute the application. According to various embodiments, the electronic device may end the output of the execution security warning notification object 830 in response to the selection of the execution cancellation button 835 and may cancel execution of the application. According to various embodiments, the electronic device may end the output of the execution security warning notification object 830 in response to the selection of the deletion button 837 and may delete the application.

According to various embodiments, the electronic device may output at least one of the installation security warning notification object 810 and the execution security warning notification object 830 on a pop-up window, may output the at least one of the installation security warning notification object 810 and the execution security warning notification object 830 on a menu screen, or may output the at least one of the installation security warning notification object 810 and the execution security warning notification object 830 on a new screen in a conversion shift scheme.

According to various embodiments, the electronic device 101 may display at least part of the installation security warning notification object 810 or the execution security warning notification object 830 using text, an image, or an icon, and the like or using a sound or vibration through an audio module (e.g., an audio module 980 of FIG. 9) or a motor (e.g., a motor 998 of FIG. 9) operatively connected to the electronic device. For example, the electronic device 101 (e.g., a processor 120 of FIG. 1) may display information (e.g., text, an image, or an icon, and the like) associated with a touch input on at least part of the application installation screen 801 or the application execution screen 803 in response to the touch input. Also, the electronic device 101 may provide the installation security warning notification object 810 or the execution security warning notification object 830 in various manners. For example, the electronic device 101 may provide the installation security warning notification object 810 or the execution security warning notification object 830 by changing a way of being output from the electronic device 101 to the outside (e.g., a way of being output on the display, a way of being outputting to the audio module, a way of being output to the motor, and the like), a color, luminosity, transparency, a display location, a size, displayed content, or a visual effect on the content.

According to various embodiments, the electronic device may control to install or execute the unauthenticated application because the unauthenticated application is misrecognized as the authenticated application by detecting that the specified image pattern added to the execution icon of the authenticated application is used for the execution icon of the unauthenticated application.

Figure 9:
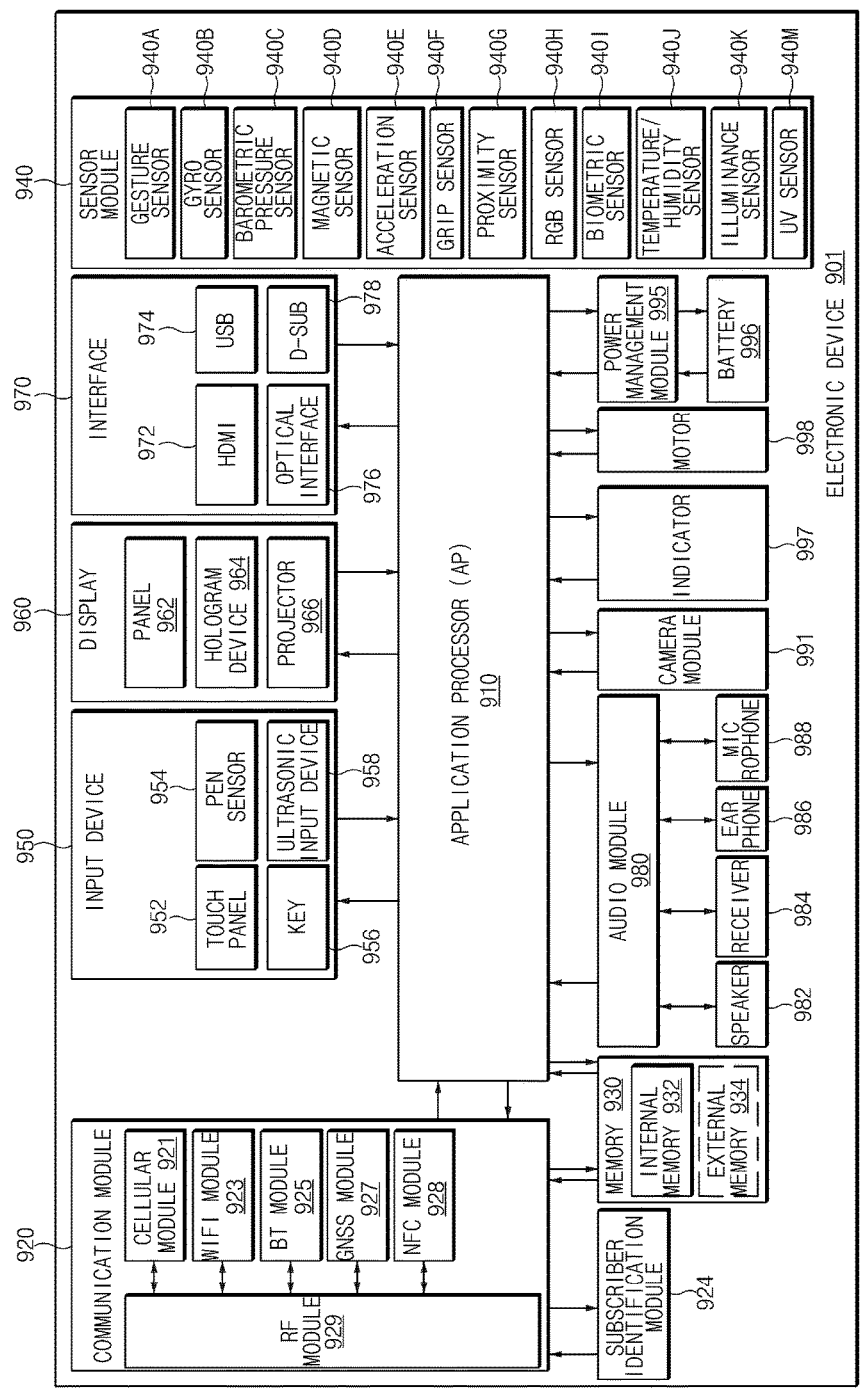
FIG. 9 illustrates a block diagram of an electronic device according to an embodiment of the present disclosure.

FIG. 9 illustrates a block diagram of an electronic device according to an embodiment of the present disclosure.

Referring to FIG. 9, an electronic device 901 may include, for example, a part or the entirety of the electronic device 101 illustrated in FIG. 1. The electronic device 901 may include at least one processor (e.g., AP) 910, a communication module 920, a subscriber identification module (SIM) 924, a memory 930, a sensor module 940, an input device 950, a display 960, an interface 970, an audio module 980, a camera module 991, a power management module 995, a battery 996, an indicator 997, and a motor 998.

The processor 910 may run an operating system or an application program so as to control a plurality of hardware or software elements connected to the processor 910, and may process various data and perform operations. The processor 910 may be implemented with, for example, a system on chip (SoC). According to an embodiment of the present disclosure, the processor 910 may further include a graphic processing unit (GPU) and/or an image signal processor. The processor 910 may include at least a portion (e.g., a cellular module 921) of the elements illustrated in FIG. 9. The processor 910 may load, on a volatile memory, an instruction or data received from at least one of other elements (e.g., a nonvolatile memory) to process the instruction or data, and may store various data in a nonvolatile memory.

The communication module 920 may have a configuration that is the same as or similar to that of the communication interface 170 of FIG. 1. The communication module 920 may include, for example, a cellular module 921, a Wi-Fi® module 923, a Bluetooth® (BT) module 925, a GNSS module 927 (e.g., a GPS module, a GLONASS module, a BeiDou module, or a Galileo module), a NFC module 928, and a radio frequency (RF) module 929.

The cellular module 921 may provide, for example, a voice call service, a video call service, a text message service, or an Internet service through a communication network. The cellular module 921 may identify and authenticate the electronic device 901 in the communication network using the SIM 924 (e.g., a SIM card). The cellular module 921 may perform at least a part of functions that may be provided by the processor 910. The cellular module 921 may include a communication processor (CP).

Each of the Wi-Fi module 923, the Bluetooth module 925, the GNSS module 927 and the NFC module 928 may include, for example, a processor for processing data transmitted/received through the modules. According to some various embodiments of the present disclosure, at least a part (e.g., two or more) of the cellular module 921, the Wi-Fi module 923, the Bluetooth module 925, the GNSS module 927, and the NFC module 928 may be included in a single integrated chip (IC) or IC package.

The RF module 929 may transmit/receive, for example, communication signals (e.g., RF signals). The RF module 929 may include, for example, a transceiver, a power amp module (PAM), a frequency filter, a low noise amplifier (LNA), an antenna, or the like. According to another embodiment of the present disclosure, at least one of the cellular module 921, the Wi-Fi module 923, the Bluetooth module 925, the GNSS module 927, or the NFC module 928 may transmit/receive RF signals through a separate RF module.

The SIM 924 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 930 (e.g., the memory 130) may include, for example, an internal memory 932 or an external memory 934. The internal memory 932 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 934 may include a flash drive such as a compact flash (CF), a secure digital (SD), a Micro-SD, a Mini-SD, an extreme digital (xD), a MultiMediaCard (MMC), a memory stick, or the like. The external memory 934 may be operatively and/or physically connected to the electronic device 901 through various interfaces.

The sensor module 940 may, for example, measure physical quantity or detect an operation state of the electronic device 901 so as to convert measured or detected information into an electrical signal. The sensor module 940 may include, for example, at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., a red/green/blue (RGB) sensor), a biometric sensor 940I, a temperature/humidity sensor 940J, an illumination sensor 940K, or an ultraviolet (UV) sensor 940M. Additionally or alternatively, the sensor module 940 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 940 may further include a control circuit for controlling at least one sensor included therein. In some various embodiments of the present disclosure, the electronic device 901 may further include a processor configured to control the sensor module 940 as a part of the processor 910 or separately, so that the sensor module 940 is controlled while the processor 910 is in a sleep state.

The input device 950 may include, for example, a touch panel 952, a (digital) pen sensor 954, a key 956, or an ultrasonic input device 958. The touch panel 952 may employ at least one of capacitive, resistive, infrared, and ultraviolet sensing methods. The touch panel 952 may further include a control circuit. The touch panel 952 may further include a tactile layer so as to provide a haptic feedback to a user.

The (digital) pen sensor 954 may include, for example, a sheet for recognition which is a part of a touch panel or is separate. The key 956 may include, for example, a physical button, an optical button, or a keypad. The ultrasonic input device 958 may sense ultrasonic waves generated by an input tool through a microphone 988 so as to identify data corresponding to the ultrasonic waves sensed.

The display 960 (e.g., the display 160) may include a panel 962, a hologram device 964, or a projector 966. The panel 962 may have a configuration that is the same as or similar to that of the display 160 of FIG. 1. The panel 962 may be, for example, flexible, transparent, or wearable. The panel 962 and the touch panel 952 may be integrated into a single module. The hologram device 964 may display a stereoscopic image in a space using a light interference phenomenon. The projector 966 may project light onto a screen so as to display an image. The screen may be disposed in the inside or the outside of the electronic device 901. According to an embodiment of the present disclosure, the display 960 may further include a control circuit for controlling the panel 962, the hologram device 964, or the projector 966.

The interface 970 may include, for example, an HDMI 972, a USB 974, an optical interface 976, or a D-subminiature (D-sub) 978. The interface 970, for example, may be included in the communication interface 170 illustrated in FIG. 1. Additionally or alternatively, the interface 970 may include, for example, a mobile high-definition link (MI-IL) interface, an SD card/multi-media card (MMC) interface, or an infrared data association (IrDA) interface.

The audio module 980 may convert, for example, a sound into an electrical signal or vice versa. At least a portion of elements of the audio module 980 may be included in the input/output interface 150 illustrated in FIG. 1. The audio module 980 may process sound information input or output through a speaker 982, a receiver 984, an earphone 986, or the microphone 988.

The camera module 991 is, for example, a device for shooting a still image or a video. According to an embodiment of the present disclosure, the camera module 991 may include at least one image sensor (e.g., a front sensor or a rear sensor), a lens, an image signal processor (ISP), or a flash (e.g., an LED or a xenon lamp).

The power management module 995 may manage power of the electronic device 901. According to an embodiment of the present disclosure, the power management module 995 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 996 and a voltage, current or temperature thereof while the battery is charged. The battery 996 may include, for example, a rechargeable battery and/or a solar battery.

The indicator 997 may display a specific state of the electronic device 901 or a part thereof (e.g., the processor 910), such as a booting state, a message state, a charging state, or the like. The motor 998 may convert an electrical signal into a mechanical vibration, and may generate a vibration or haptic effect. Although not illustrated, a processing device (e.g., a GPU) for supporting a mobile TV may be included in the electronic device 901. The processing device for supporting a mobile TV may process media data according to the standards of digital multimedia broadcasting (DMB), digital video broadcasting (DVB), MEDIAFLO®, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 10:
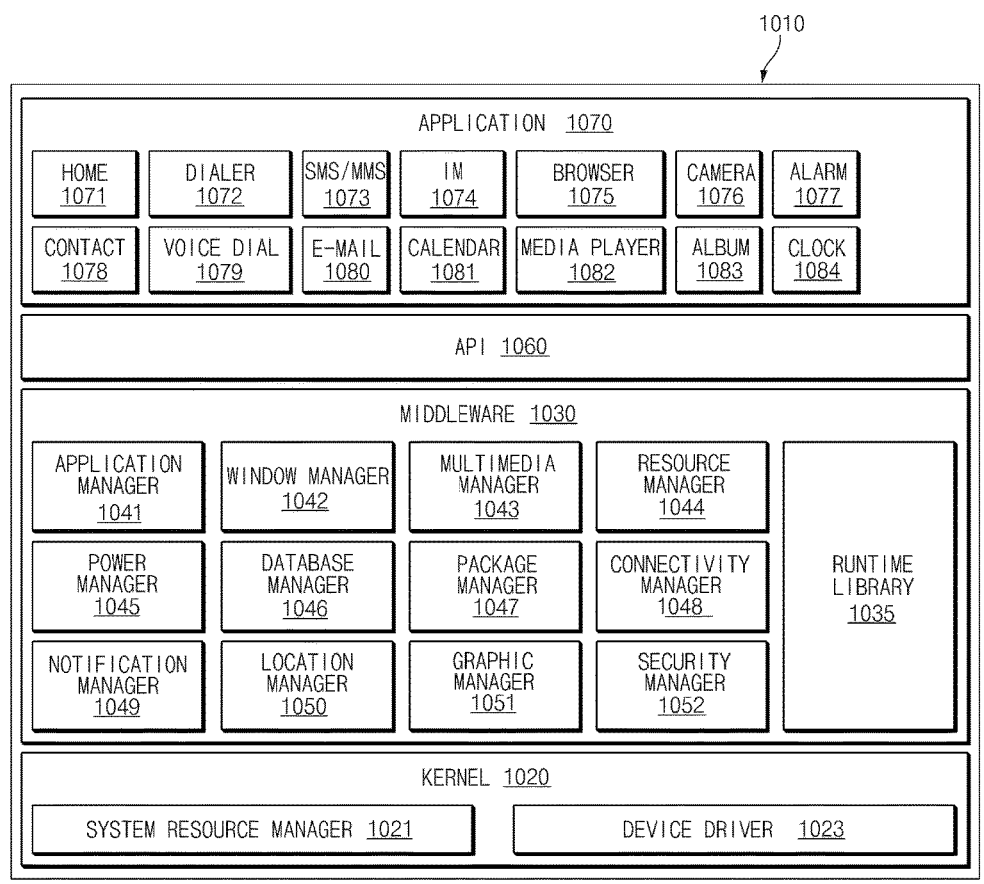
FIG. 10 illustrates a block diagram of a program module according to an embodiment of the present disclosure.

FIG. 10 illustrates a block diagram of a program module according to an embodiment of the present disclosure.

Referring to FIG. 10, a program module 1010 (e.g., the program 140) may include an operating system (OS) for controlling a resource related to an electronic device (e.g., the electronic device 101) and/or various applications (e.g., the application program 147) running on the OS. The operating system may be, for example, ANDROID®, iOS®, WINDOWS®, SYMBIAN, TIZEN®, or the like.

The program module 1010 may include a kernel 1020, a middleware 1030, an API 1060, and/or an application 1070. At least a part of the program module 1010 may be preloaded on an electronic device or may be downloaded from an external electronic device (e.g., the first electronic device 102, the second external electronic device 104, or the server 106).

The kernel 1020 (e.g., the kernel 141) may include, for example, a system resource manager 1021 or a device driver 1023. The system resource manager 1021 may perform control, allocation, or retrieval of a system resource. According to an embodiment of the present disclosure, the system resource manager 1021 may include a process management unit, a memory management unit, a file system management unit, or the like. The device driver 1023 may include, for example, a display driver, a camera driver, a BLUETOOTH® driver, a shared memory driver, a USB driver, a keypad driver, a WI-FI® driver, an audio driver, or an inter-process communication (IPC) driver.

The middleware 1030, for example, may provide a function that the applications 1070 require in common, or may provide various functions to the applications 1070 through the API 1060 so that the applications 1070 may efficiently use limited system resources in the electronic device. According to an embodiment of the present disclosure, the middleware 1030 (e.g., the middleware 143) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, and a security manager 1052.

The runtime library 1035 may include, for example, a library module that a complier uses to add a new function through a programming language while the application 1070 is running. The runtime library 1035 may perform a function for input/output management, memory management, or an arithmetic function.

The application manager 1041 may mange, for example, a life cycle of at least one of the applications 1070. The window manager 1042 may manage a GUI resource used in a screen. The multimedia manager 1043 may recognize a format required for playing various media files and may encode or decode a media file using a codec matched to the format. The resource manager 1044 may manage a resource such as a source code, a memory, or a storage space of at least one of the applications 1070.

The power manager 1045, for example, may operate together with a basic input/output system (BIOS) to manage a battery or power and may provide power information required for operating the electronic device. The database manager 1046 may generate, search, or modify a database to be used in at least one of the applications 1070. The package manager 1047 may manage installation or update of an application distributed in a package file format.

The connectivity manger 1048 may manage wireless connection of Wi-Fi, Bluetooth, or the like. The notification manager 1049 may display or notify an event such as message arrival, appointments, and proximity alerts in such a manner as not to disturb a user. The location manager 1050 may manage location information of the electronic device. The graphic manager 1051 may manage a graphic effect to be provided to a user or a user interface related thereto. The security manager 1052 may provide various security functions required for system security or user authentication. According to an embodiment of the present disclosure, in the case in which an electronic device (e.g., the electronic device 101) includes a phone function, the middleware 1030 may further include a telephony manager for managing a voice or video call function of the electronic device.

The middleware 1030 may include a middleware module for forming a combination of various functions of the above-mentioned elements. The middleware 1030 may provide a module specialized for each type of an operating system to provide differentiated functions. Furthermore, the middleware 1030 may delete a part of existing elements or may add new elements dynamically.

The API 1060 (e.g., the API 145) which is, for example, a set of API programming functions may be provided in different configurations according to an operating system. For example, in the case of Android or iOS, one API set may be provided for each platform, and, in the case of TIZEN®, at least two API sets may be provided for each platform.

The application 1070 (e.g., the application program 147), for example, may include at least one application capable of performing functions such as a home 1071, a dialer 1072, an SMS/MMS 1073, an instant message (IM) 1074, a browser 1075, a camera 1076, an alarm 1077, a contact 1078, a voice dial 1079, an e-mail 1080, a calendar 1081, a media player 1082, an album 1083, a clock 1084, health care (e.g., measure an exercise amount or blood sugar), or environmental information provision (e.g., provide air pressure, humidity, or temperature information).

According to an embodiment of the present disclosure, the application 1070 may include an information exchange application for supporting information exchange between the electronic device (e.g., the electronic device 101) and an external electronic device (e.g., the first electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 102 or the second external electronic device 104) communicating with the electronic device, an application running in the external electronic device, or a service (e.g., a call service, a message service, or the like) provided from the external electronic device.

According to an embodiment of the present disclosure, the application 1070 may include a specified application (e.g., a healthcare application of a mobile medical device) according to an attribute of the external electronic device (e.g., the first electronic device 102 or the second external electronic device 104). The application 1070 may include an application received from an external electronic device (e.g., the first electronic device 102 or the second external electronic device 104). The application 1070 may include a preloaded application or a third-party application downloadable from a server. The names of the elements of the program module 1010 illustrated may vary with the type of an operating system.

According to various embodiments of the present disclosure, at least a part of the program module 1010 may be implemented with software, firmware, hardware, or a combination thereof. At least a part of the program module 1010, for example, may be implemented (e.g., executed) by a processor (e.g., the processor 910). At least a part of the program module 1010 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor. For example, the memory may include instructions that, when executed by the processor, cause the processor to receive a request to install or execute an application, verify whether the application is authenticated, and provide a result of comparing at least part of an icon for executing the application with a security indication associated with security of the application, based on whether the application is authenticated.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An electronic device, comprising:
a memory configured to store an application;
a communication interface; and a processor operatively connected to the memory and the communication interface,
wherein the processor is configured to:
receive a request to install or execute the application,
transmit an authentication request for the application to an external electronic device using the communication interface in response to the request,
receive a response indicating an authentication result from the external electronic device using the communication interface in response to the authentication request,
when the response indicates that the application is unauthenticated, determine whether a first image of an execution icon of the application includes a second image of a predetermined security indication by comparing at least part of the first image with the second image,
when the first image includes the second image, provide a notification of a security warning for the application and restrict an installation and execution of the application,
determine that the first image includes the second image when a similarity between the at least part of the first image and the second image is greater than a threshold value, and
determine that the first image does not include the second image when the similarity is less than or equal to the threshold value,
wherein the predetermined security indication comprises at least one of an image pattern, a badge image, or text.

2. The electronic device of claim 1, wherein the processor is configured to:
when the response indicates that the application is authenticated, install or execute the application in response to the response.

3. The electronic device of claim 1,
wherein the authentication request includes security information of the application.

4. The electronic device of claim 3, wherein the security information comprises designated information to indicate that the application is an authenticated application.

5. The electronic device of claim 4, wherein the designated information comprises designated tag information included in meta information of the application.

6. The electronic device of claim 5, wherein the processor is configured to:
when the application includes the designated information, transmit the authentication request for the application to the external electronic device using the communication interface in response to the request, and
when the application does not include the designated information, determine whether the first image of the execution icon of the application includes the second image of the predetermined security indication.

7. The electronic device of claim 1, wherein the notification of the security warning comprises at least one of a first information about a result of authenticating the application or a second information about a result of a comparison between at least part of the execution icon and the predetermined security indication.

8. The electronic device of claim 1, further comprising a display, and
wherein the processor is configured to display the notification of the security warning through the display.

9. The electronic device of claim 1, wherein the processor is configured to store at least one of a first information about a result of authenticating the application or a comparison between at least part of the execution icon and the predetermined security indication in the memory.

10. The electronic device of claim 9, wherein the processor is configured to:
determine whether the application is authenticated, using the first information being stored in the memory when another request to install or execute the application is received; and
provide a second information being stored in the memory.

11. A method for performing a security function in an electronic device, the method comprising:
receiving a request to install or execute an application;
transmitting an authentication request for the application to an external electronic device in response to the request;
receiving a response indicating an authentication result from the external electronic device in response to the authentication request;
when the response indicates that the application is unauthenticated, determining whether a first image of an execution icon of the application includes a second image of a predetermined security indication by comparing at least part of the first image with the second image;
when the first image includes the second image, providing a notification of a security warning for the application and restricting an installation and an execution of the application;
determining that the first image includes the second image when a similarity between the at least part of the first image and the second image is greater than a threshold value; and
determining that the first image does not include the second image when the similarity is less than or equal to the threshold value,
wherein the predetermined security indication comprises at least one of an image pattern, a badge image, or text.

12. The method of claim 11, further comprising:
when the response indicates that the application is authenticated, installing or executing the application in response to the response.

13. The method of claim 11, wherein the authentication request includes security information of the application.

14. The method of claim 13,
wherein the security information comprises designated information to indicate that the application is an authenticated application.

15. The method of claim 14, wherein the designated information includes designated tag information included in meta information of the application.

16. A non-transitory computer-readable recording medium storing embodied thereon instructions, the instructions for, when executed by at least one processor, being configured to:
receive a request to install or execute an application;
transmit an authentication request for the application to an external electronic device in response to the request;
receive a response indicating an authentication result from the external electronic device in response to the authentication request;
when the response indicates that the application is unauthenticated, determine whether a first image of an execution icon of the application includes a second image of a predetermined security indication by comparing at least part of the first image with the second image;

when the first image includes the second image, provide a notification of a security warning for the application and restrict an installation and an execution of the application,
determine that the first image includes the second image when a similarity between the at least part of the first image and the second image is greater than a threshold value, and
determine that the first image does not include the second image when the similarity is less than or equal to the threshold value,
wherein the predetermined security indication comprises at least one of an image pattern, a badge image, or text.

\* \* \* \* \*